United States Patent
Riani et al.

(10) Patent No.: US 10,659,337 B2
(45) Date of Patent: May 19, 2020

(54) RETIMER DATA COMMUNICATION MODULES

(71) Applicant: INPHI CORPORATION, Santa Clara, CA (US)

(72) Inventors: Jamal Riani, Fremont, CA (US); Arash Farhoodfar, Sunnyvale, CA (US); Sudeep Bhoja, San Jose, CA (US); Tarun Setya, Kanata (CA)

(73) Assignee: INPHI CORPORATION, Santa Clara, CA (US)

( * ) Notice: Subject to any disclaimer, the term of this patent is extended or adjusted under 35 U.S.C. 154(b) by 95 days.

(21) Appl. No.: 16/115,291

(22) Filed: Aug. 28, 2018

(65) Prior Publication Data
US 2020/0076720 A1    Mar. 5, 2020

(51) Int. Cl.
*H04L 1/18* (2006.01)
*H04L 12/26* (2006.01)
*H04L 1/00* (2006.01)
*G06F 13/40* (2006.01)

(52) U.S. Cl.
CPC .......... *H04L 43/12* (2013.01); *G06F 13/4068* (2013.01); *H04L 1/0057* (2013.01)

(58) Field of Classification Search
None
See application file for complete search history.

(56) References Cited

U.S. PATENT DOCUMENTS

| | | | |
|---|---|---|---|
| 2005/0152268 A1* | 7/2005 | Lesartre | H04L 1/1809 370/216 |
| 2008/0005620 A1* | 1/2008 | Walker | G06F 11/0745 714/43 |
| 2013/0308471 A1* | 11/2013 | Krzanowski | H04L 43/0811 370/252 |
| 2018/0181502 A1* | 6/2018 | Jen | G06F 13/4022 |
| 2018/0191523 A1* | 7/2018 | Shah | H04L 49/15 |
| 2018/0285227 A1* | 10/2018 | Sharma | G06F 11/3079 |
| 2019/0044824 A1* | 2/2019 | Yadav | H04L 43/12 |
| 2019/0361763 A1* | 11/2019 | Bakshi | G06F 11/3051 |

* cited by examiner

*Primary Examiner* — Mujtaba M Chaudry
(74) *Attorney, Agent, or Firm* — Richard T. Ogawa; Ogawa P.C.

(57) ABSTRACT

The present invention is directed to data communication systems and techniques thereof. More specifically, embodiments of the present invention provide a retimer module that includes plurality of communication lanes for interfacing with a host system and a line system. The retimer module includes a link monitor and cross point sections. The retimer also includes a management interface module. There are other embodiments as well.

20 Claims, 7 Drawing Sheets

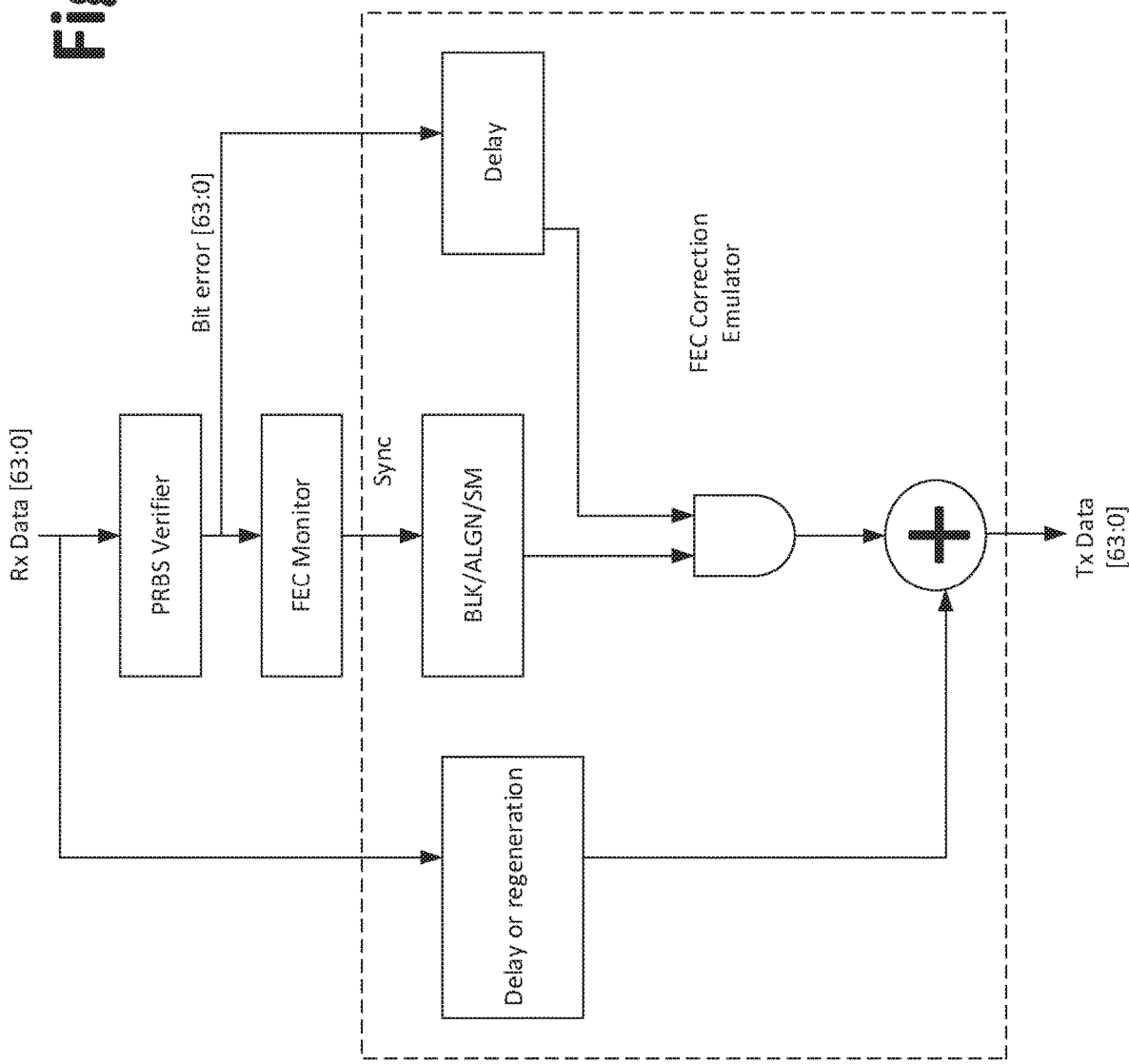

RETIMER DATA COMMUNICATION MODULES

CROSS-REFERENCES TO RELATED APPLICATIONS

NOT APPLICABLE

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

The present invention is directed to data communication systems and techniques thereof.

Over the last few decades, the use of communication networks has exploded. In the early days of the Internet, popular applications were limited to emails, bulletin board, and mostly informational and text-based web page surfing, and the amount of data transferred had been relatively small. Today, the Internet and mobile applications demand a huge amount of bandwidth for transferring photo, video, music, and other multimedia files. For example, a social network like Facebook processes more than 500 TB of data daily. With such high demands on data storage and data transfer, existing data communication systems need to be improved to address these needs.

For high speed data communication applications, re-timer modules are often used. Existing re-timer modules are inadequate for lacking the desired levels of performance. Therefore, improved re-timer modules are needed.

BRIEF SUMMARY OF THE INVENTION

The present invention is directed to data communication systems and techniques thereof. More specifically, embodiments of the present invention provide a retimer module that includes plurality of communication lanes for interfacing with a host system and a line system. The retimer module includes a link monitor and cross point sections. The retimer also includes a management interface module. There are other embodiments as well.

According to an embodiment, the present invention provides a data communication device that includes a host receive section for receiving incoming host data from a host device. The host receive section has a plurality of host receive lanes. The plurality of host receive lanes includes a first host receive lane, which has a first analog interface and a first pattern checker module. The device also includes a host transmit section for transmitting outgoing host data to the host device. The host transmit section has a plurality of host transmit lanes and a host cross point section. The plurality of host transmit lanes includes a first host transmit lane. The first host transmit lane includes a first buffer and a first pattern generator. The device further includes a link monitor section coupled to the host receive section and the host transmit section. The device additionally includes a line receive section for receiving incoming line data from a line device. The line receive section has a plurality of line receive lanes. The plurality of line receive lanes has a first line receive lane, which includes a first sequence checker and a first soft FEC decoder. The device additionally includes a line transmit section for transmitting outing line data to the line device. The line transmit section has a plurality of line transmit lanes and a line cross point section. The plurality of line transmit lanes includes a first line transmit lane, the first line transmit lane including a first soft FEC encoder. The device further includes a management interface module coupled to the link monitor section. The incoming host data are transmitted to the line device via the host receive section and line transmit section in an egress operation. The incoming line data are transmitted the host device via the line receive section and the host transmit section in an ingress operation.

According to another embodiment, the present invention provides a data communication device, which includes a host receive section for receiving incoming host data from a host device. The host receive section has a plurality of host receive lanes. The device also includes a host transmit section for transmitting outgoing host data to the host device. The host transmit section has a plurality of host transmit lanes and a host cross point section. The device further includes a line receive section for receiving incoming line data from a line device. The line receive section has a plurality of line receive lanes. The device further includes a line transmit section for transmitting outing line data to the line device. The line transmit section includes a plurality of line transmit lanes and a line cross point section. The device further includes a link monitor section coupled to the host receive section and the line transmit section. The link monitor section is configured to detector errors from the incoming host data and the incoming line data. The device also includes a management interface module coupled to the link monitor section. The incoming host data are transmitted to the line device via the host receive section and line transmit section in an egress operation. The incoming line data are transmitted the host device via the line receive section and the host transmit section in an ingress operation.

According to yet another embodiment, the present invention provides a data communication device that includes a host receive section for receiving incoming host data from a host device. The host receive section has a plurality of host receive lanes, which includes a first host receive lane. The first receive lane includes a first analog interface and a first pattern checker module. The device also includes a host transmit section for transmitting outgoing host data to the host device. The host transmit section has a plurality of host transmit lanes and a host cross point section. The plurality of host transmit lanes includes a first host transmit lane. The first host transmit lane includes a first buffer and a first pattern generator. The device further includes a link monitor section coupled to the host receive section and the host transmit section. The device includes a line receive section for receiving incoming line data from a line device. The line receive section has a plurality of line receive lanes, which includes a first line receive lane. The first line receive lane has a first sequence checker and a first soft FEC decoder. The device further includes a line transmit section for transmitting outing line data to the line device. The line transmit section has a plurality of line transmit lanes and a line cross point section. The plurality of line transmit lanes includes a first line transmit lane, which has a first soft FEC encoder. The device further includes a management interface module coupled to the link monitor section. The management interface module has an MDIO block and an MCU block.

It is to be appreciated that embodiments of the present invention provide many advantages over conventional techniques. Among other things, the re-timer module allows flexible implementation of high-speed communication network systems. For example, various fast communication protocols such as PAM-4 communication techniques is supported for optical communication networks. Re-timer modules according to embodiments of the present invention can be readily adopted into data centers and provide performance improvement and cost reduction.

Embodiments of the present invention can be implemented in conjunction with existing systems and processes. For example, re-timer modules according to the present invention can be physically compatible with the QSFP56 form factor. Additionally, embodiments of the present invention can be manufactured using existing manufacturing techniques and equipment. There are other benefits as well.

The present invention achieves these benefits and others in the context of known technology. However, a further understanding of the nature and advantages of the present invention may be realized by reference to the latter portions of the specification and attached drawings.

BRIEF DESCRIPTION OF THE DRAWINGS

The present invention is directed to data communication systems and techniques thereof. More specifically, embodiments of the present invention provide a retimer module that includes plurality of communication lanes for interfacing with a host system and a line system. The retimer module includes a link monitor and cross point sections. The retimer also includes a management interface module. There are other embodiments as well.

FIG. 7 is a high-level block diagram illustrating a single slice of the link monitor for serving a PAM-4 or NRZ data stream according to embodiments of the present invention.

DETAILED DESCRIPTION OF THE INVENTION

The present invention is directed to data communication systems and techniques thereof. More specifically, embodiments of the present invention provide a retimer module that includes plurality of communication lanes for interfacing with a host and a line. The retimer module includes a link monitor and cross point sections. The retimer also includes a management interface module. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
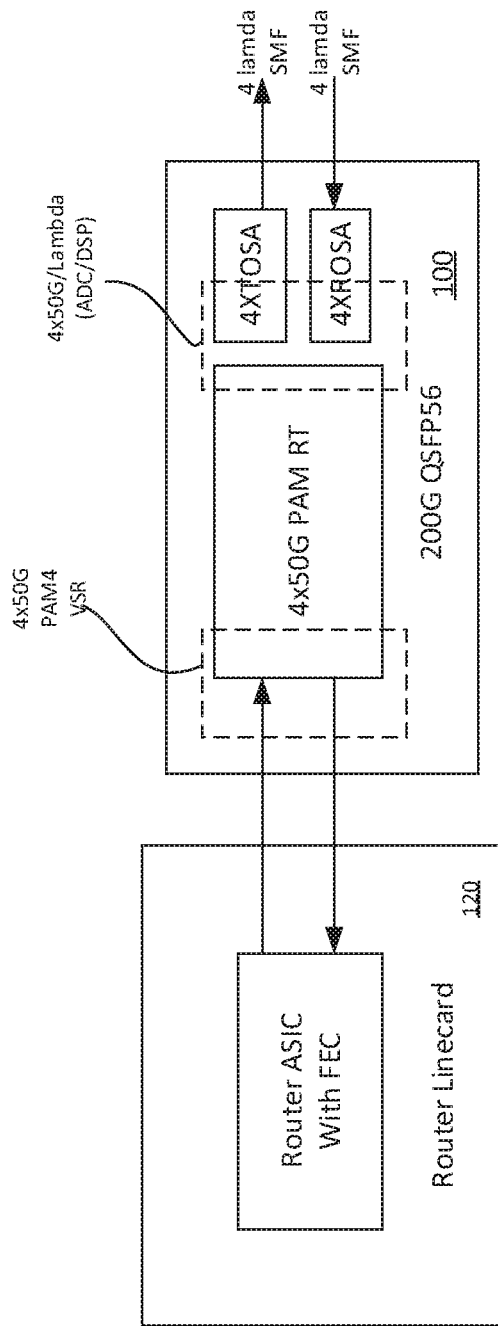
FIG. 1 is a simplified diagram illustrating a communication module 100 according to embodiments of the present invention.

FIG. 1 is a simplified diagram illustrating a communication module 100 according to embodiments of the present invention. This diagram is merely an example, which should not unduly limit the scope of the claims. One of ordinary skill in the art would recognize many variations, alternatives, and modifications. Among other features, the communication module can be readily deployed at data centers that require 100 Gb/s or 200 Gb/s Ethernet. For data center applications, it is desirable to have optical modules that support 200 Gb/s and comply to the QSFP56 form factor, with lower cost and lower power compared to existing modules. To reduce the cost of the modules, efforts have been made to reduce the number of optical components by decreasing the number of wavelengths used to transmit data at 200 Gb/s, which requires advanced modulation techniques. Pulse amplitude modulation (PAM) is emerging as a preferred modulation technique for such application. For example, the "IN015050-CC02" module is a four-port duplex re-timer for PAM-4 signals between the line and host interfaces. The exemplary communication module illustrated in FIG. 1 is an application diagram of a QSFP56 module using the IN015050-CC02. The communication module 100 includes a transmitter interface (e.g., "4XTOSA") for transmitting four 50G data lanes and a receiver interface (e.g., "4XROSA") for receiving four 50G data lanes. Various DSP processes are performed for transmitted and received data. Communication module 100 interfaces with router line card 120 using four 50G PAM4 communication lanes. More detailed descriptions are provided below.

Figure 2:
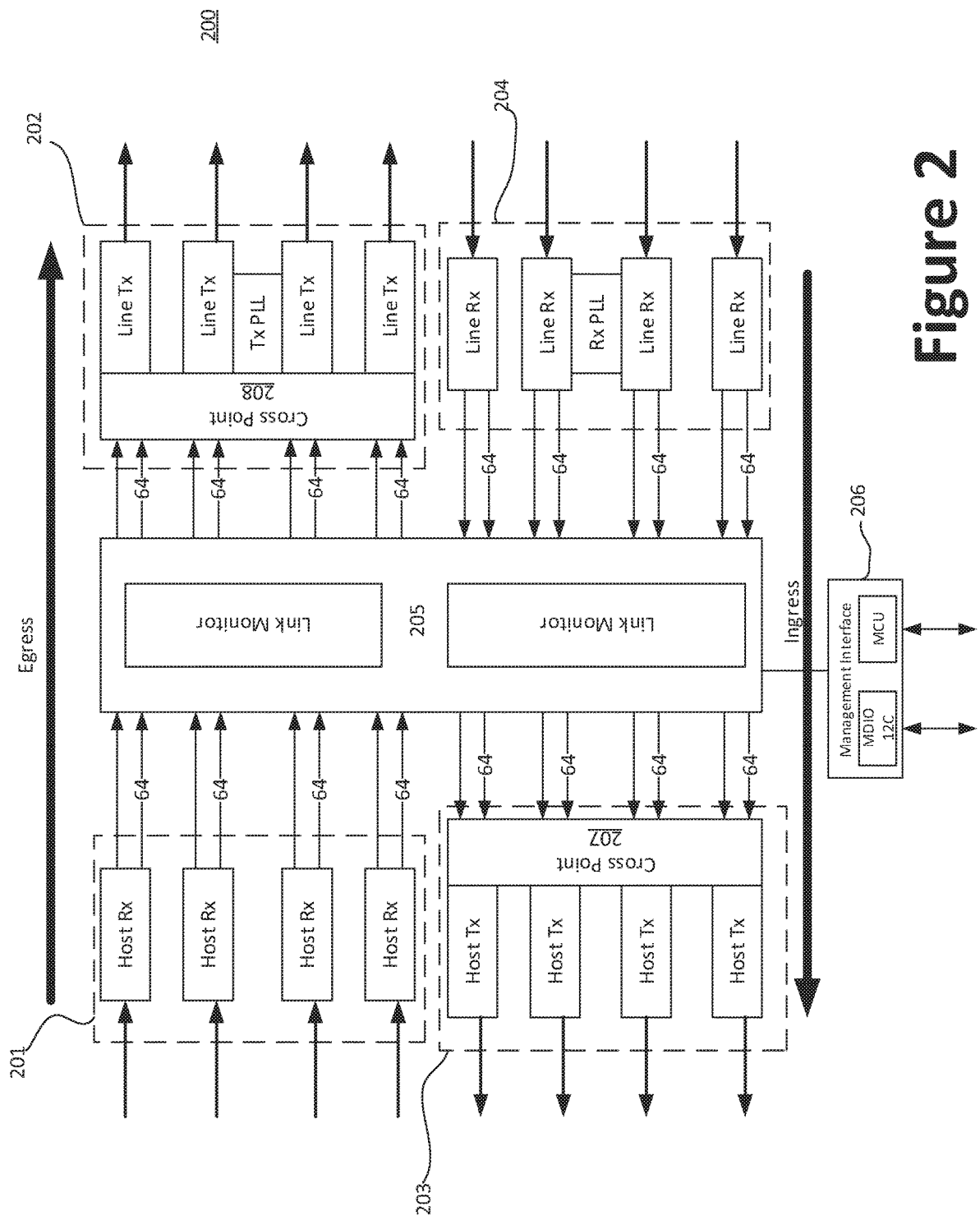
FIG. 2 is a simplified diagram illustrating a re-timer module according to embodiments of the present invention.

FIG. 2 is a simplified diagram illustrating a re-timer module according to embodiments of the present invention. This diagram is merely an example, which should not unduly limit the scope of the claims. One of ordinary skill in the art would recognize many variations, alternatives, and modifications. As shown in FIG. 2, retimer module 200 includes host Rx section 201 and host Tx section 203 that interface with a host system (not shown). As respective names and arrows imply, host Rx section 201 receives data from the host system, and the host Tx section 203 transmits data to the host system. Retimer module 200 also includes line Tx section 202 and line Rx section 204. For data transmitted from host system to line, a data path (i.e., egress data path) is formed by host Rx section 201 and line Tx section 202, with link monitor section 205 in the middle.

For processes such as diagnostics at the host system, the host system may transmit data to host Rx section 201, and then through the cross point 207 at host Tx section 203. The data originally transmitted from the host system are transmitted back to the host system by host Tx section 203. For example, such process is sometimes referred to as shallow digital host loopback. In various implementations, data are transmitted using PAM format (e.g., PAM-4), and the data are in digital format (i.e., without being converted to analog signal) during the loopback process. For example, cross point 207 allows re-timer module 200 to select between transmitting data received from the line side of the host system side.

On the line side, data are received by the line Rx section 204. Outgoing data (transmitted from retimer module 200 to the side) are transmitted by the line Tx section 202. In a standard operation, data are received by the line Rx section 204 at the line side, analyzed by the link monitor 205, and then transmitted to the host system by host Tx section 203. Data from the host system are received by the host Rx section 201, analyzed by link monitor 205, and transmitted to the line side by line Tx section 202.

On the line side, line Tx section 202 and line Rx section 204 can also operate in a shallow digital line loopback mode. For example, data received from the line side are received by line Rx section 204 and routed to line Tx section 202 via cross point 208. In various implementations, shallow digital line loopback mode can be used for diagnostics and/or other purposes, and data transmitted are in PAM digital format (e.g., PAM-4 format). In various embodiments, data received at line Rx section 204 are forwarded to the host system when operating in shallow digital line loopback mode. When more than one PAM-4 lanes are operating in shallow digital line loopback mode, these lanes are frequency locked, since line Tx section 202 only has a single PLL.

It is to be appreciated that the retimer module 200 can be configured to operate in various modes and can support a wide variety of standards. For example, the following data rates (e.g., from 10.3 Gbps to 28.125 Gbps) are supported:
  20.625 GBaud, 25.78125 GBaud, and 26.5625 GBaud PAM-4
  10.3125 Gbit/s, 25.78125 Gbit/s or 26.5625 Gbit/s NRZ data
  28.125 Gbps NRZ or 28.125 GBaud PAM-4 data The operation of retimer module 200 is in large part controlled by management interface 206, which is coupled to link monitor 205. As explained above, link monitor 205 is positioned between the host side sections (201 and 203) and line side sections (202 and 204), and it is configured to monitor the data traffic going through retimer module 200 to ensure proper operation. In various embodiments, link monitor 205 is configured to provide diagnostic functions and analyzes a specific type of diagnostic data. Management interface 206 comprises a management data input/output (MIDIO) interface and a microcontroller unit (MCU) as shown. In a specific implementation, retimer module 200 has 0.75, 1V and 1.95V (1.6V in non-EML mode) power supply rails.

To start the operation, a transceiver startup sequence and a bring-up sequence are initiated through firmware (FW) and application programming interface (API). For example, the initiation process involves fetching certain "eFuse" contents, followed by powering up of components such as bandgap, voltage regulator and PLL. The data paths, both ingress and egress data paths as shown in FIG. 2, are then brought up in sequence.

After retimer module 200 has gone through the initialization sequence, various required modes can be set up by writing to configuration registers (e.g., the MMD30 registers in specific implementations).

In various embodiments, retimer module 200 works in conjunction with a storage unit, which may be implemented with an EEPROM device that is connected through an SPI interface. The EEPROM device stores the startup and DSP sequencing codes that are to be read by retimer module 200 at startup. This enables power up of the device independent from the power up of the entire module. It is to be appreciated that the initiation sequence automatically enables all the internal design blocks to their proper operating states. For example, many registers associated with the internal blocks do not have to be written externally through the MDIO/I2C interface.

As explained above, retimer module 200 includes management interface 206 for managing its operations. Management interface 206 can be configured/monitored via an MDIO or an I2C interface. In a specific embodiment, retimer module 200 implements two IEEE802.3 Clause 45 MDIO Manageable Device (MMD) address spaces: MMD8 and MMD30. More specifically, the MMD8 address space is specified by IEEE802.3-2012 for the separated PMA layer closest to the PMD. The MMD30 address space is specified by IEEE802.3-2012 as a vendor specific address space.

In various embodiments, the management data input/output (MDIO) interface complies with the timing characteristics described in IEEE802.3 Clause 22 and complies with the frame structure extensions and electrical characteristics described in IEEE802.3 Clause 45. In the MDIO lexicon, a device driving an MDIO bus is called a station management entity (STA), and the device being managed by the STA is called the MDIO manageable device (MMD). The STA drives the MDC line. It initiates a transaction using a MDIO frame that contains the target address inside the device. During a write transaction, the STA also provides the data. In the case of a read transaction, the MMD assumes control of the MDIO line and supplies the STA with the requested data. For example, retimer module 200 can be implemented to strictly as a MMD. MDIO operation is established by ensuring the certain I/O is properly grounded.

Re-timer modules, as illustrated in FIG. 2, include line side and host side. The line side includes line receivers. For example, the receiver module 204 in FIG. 2 includes four line side receivers. For example, four ADC/DSP-based line side receivers each operates at 28 Gbaud/s data rate. Each of the line receivers includes one or more equalizers. For example, an equalizer can be implemented as a combination of digital FFE and DFE. Line receivers may additionally incorporate automatic gain control loop to load the receiver ADC appropriately. Line receivers may also support eye monitor function on the receiver and slicer threshold adjust for each PAM4 level.

For error checking, line receivers may utilize PRBS checkers. For example, PRBS checkers are provide for each lane on the entire data width, or per even/odd bits. In various implementations, PRBS checkers support PRBS7, PRBS9, PRBS11, PRBS15, PRBS23, PRBS31, and inversions thereof. When operating in auto lock mode, the communication system scans through all PRBS patterns.

Figure 3:
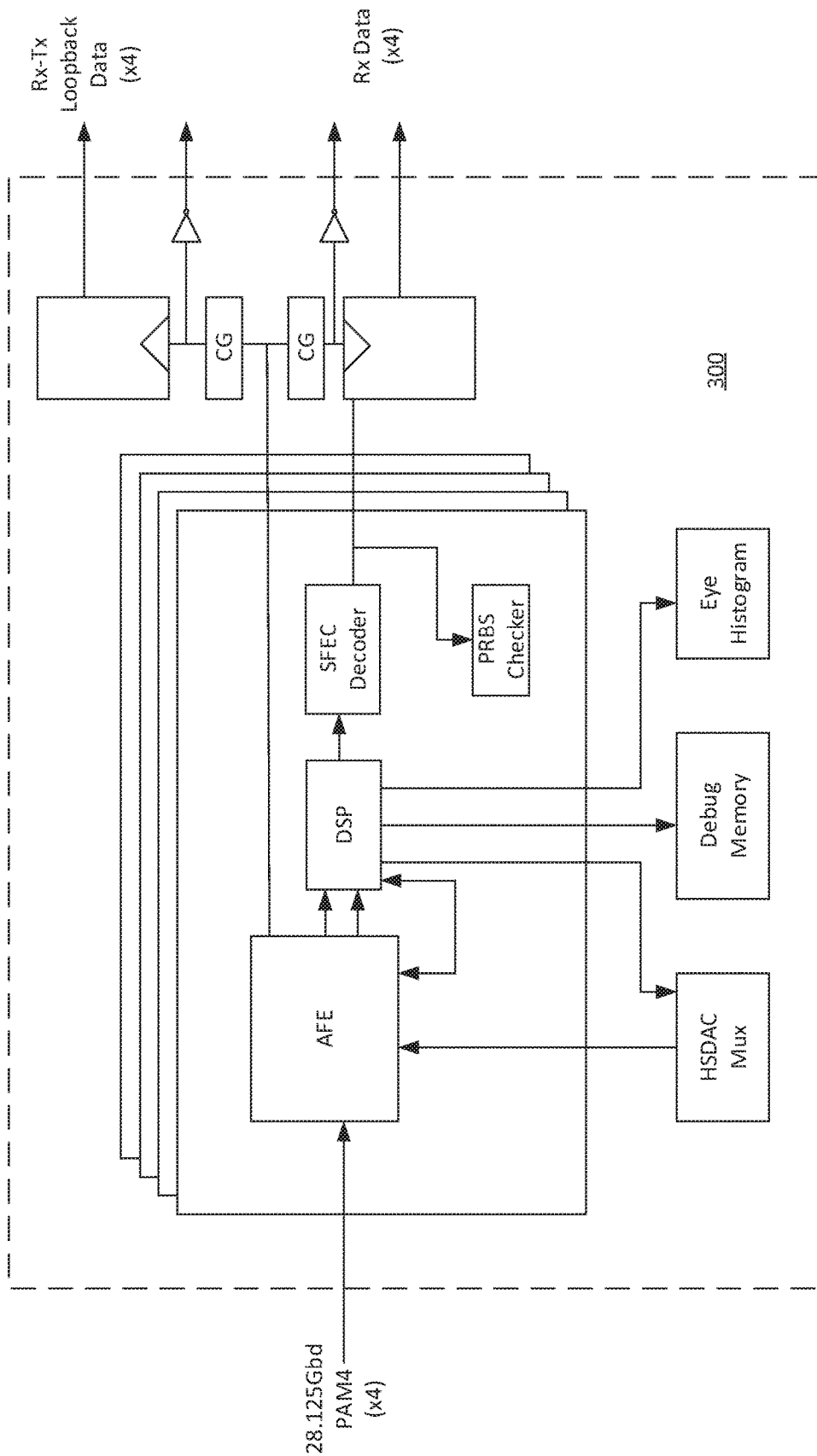
FIG. 3 is a simplified diagram illustrating a line receiver module according to embodiments of the present invention.

FIG. 3 is a simplified diagram illustrating a line receiver module according to embodiments of the present invention. This diagram is merely an example, which should not unduly limit the scope of the claims. One of ordinary skill in the art would recognize many variations, alternatives, and modifications. The line receiver module 300 is implemented as a part of retimer module 200, and it is configured on the line side for receiving optical signals. Receiver module 300 includes four receivers (shown as stacked receiver slices) for supporting data streams of up to 28.125 GBd with PAM-4 modulation (56.25 Gb/s). A common PLL is configured to serve four lanes. As an example, the high-speed analog front end (AFE) section of the data path consists of four lanes that each handles up to 56 Gbps of PAM-4 data. In various implementations, the AFE section comprises equalizer and variable gain amplifier (VGA), which are not shown in FIG. 3.

In a specific embodiment, the VGA is AC-coupled to the line signal via external capacitors and has about 50 ohms of internal resistance. The AFE includes a continuous time linear equalizer (CTLE) that is designed to provide high performance boost. For example, the auto gain control and CTLE functions can be configured to be auto-adaptive. An on-chip low dropout regulator is used to provide a regulated voltage to function blocks of the AFE.

The line side receiver (line RX) PLL provides the needed high-speed clocks to be used for PAM-4 operation. The phase interpolator (PI) and delay-lock loop (DLL) together provide the 4 phases of 7 GHz clock to sample the incoming data. For certain implementations, retimer module 200 supports reference-less operation, where the line RX PLL gets its reference clock from one of the host receivers.

The digital signal processing (DSP) module of receiver module 300 includes a line RxD macro, which is a part of the data path. The DSP module provides many functionalities. Depending on the implementation, the DSP module may include an FFE block, a PAM-4 slicer, a PAM4-DFE, a PAM-4 reflection canceler, a PAM-4 level dependent equalizer, a PAM-4 1+D de-precoder, and/or a soft FEC decoder.

As an example, the FEC block may be implemented with an 6/10-tap FFE. The assumption is that the interface is 32-unit intervals (UI) interleaved. The 6/10-tap FFE, with gain and DC offset compensation, provides the equalization needed. The 10-taps are fully adaptive. The PAM-4 slicer block compares the FFE output data with thresholds (e.g., {Tn, Tm, Tp}), and produces the PAM-4 decisions. For example, thresholds {Tn, Tm, Tp} are adaptive and can be used to compensate for the level-dependent noise nature of optical channels. The PAM-4 decision feedback equalizer (DFE) is configured to provide nonlinear adaptive feedback on the inner levels in the data path. The line receiver module 300 may also include a PAM-4 reflection canceller to reduce group-delay effects. The line receiver module 300 may additionally include a PAM-4 level dependent equalizer, which provides equalization for the two inner levels of the PAM-4 eyes. The PAM-4 1+D de-precoder block is configured to operate in DFE mode. In the DFE mode, to overcome DFE Error propagation, a 1/(1+D) pre-coder is employed on the transmit driver and on the receiver end. The final DFE decisions pass through the (1+D) filter to cancel the effect of pre-coder. The line receiver module 300 may also include a soft FEC that work with parity check code, which inserts parity information every 20 FEC symbols. It is to be appreciated that the soft FEC can provide a 1.5 dB gain with 5% overhead. In various implementations, SFEC supports in 200GE mode where the host data is KP4 FEC encoded. For example, the use of SFEC is described in patent application Ser. No. 15/691,023, filed Aug. 30, 2017, which is incorporated by reference herein.

In various embodiments, the line receiver module 300 is configured to provide various diagnostic features. For example, the line receiver module 300 utilizes a pseudo-random binary sequence (PRBS) checker to check each of the communication lanes (e.g., on the entire data width, or per even/odd bits), and the PRBS checker may provide the follow features:

Supports PRBS7, PRBS9, PRBS11, PRBS15, PRBS16, PRBS23 and PRBS31 plus their inversions, such as PRBS13Q Auto lock mode which scans through all PRBS patterns PRBS stay in lock mode Programmable threshold and duration for lock declaration Counters support snapshot or individual read mode Error trigger to debug memory to initiate data capture The diagnostic features may also include a 32 KB capture memory to probe ADC and DSP internals shared across all 4 lanes. The diagnostic features may further include eye histogram processing shared across all 4 lanes.

Figure 4:
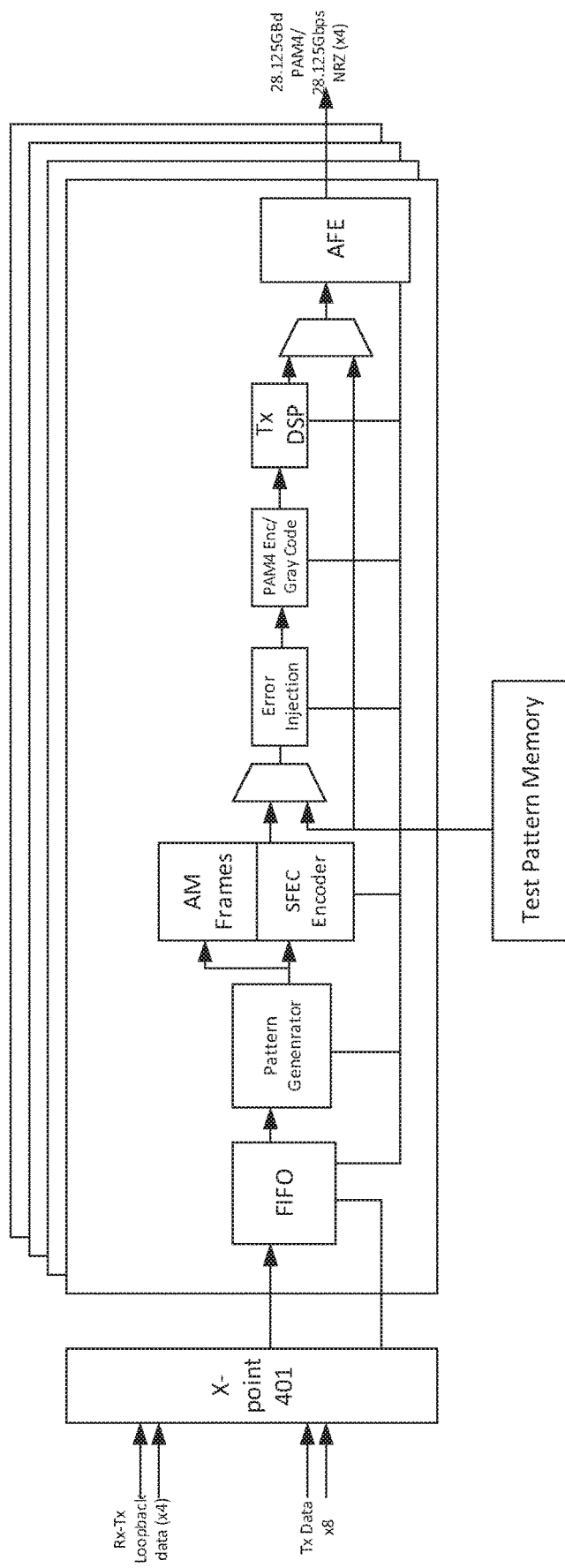
FIG. 4 is a simplified diagram illustrating a line side transmitter module 400 according to embodiments of the present invention.

FIG. 4 is a simplified diagram illustrating a line side transmitter module 400 according to embodiments of the present invention. This diagram is merely an example, which should not unduly limit the scope of the claims. One of ordinary skill in the art would recognize many variations, alternatives, and modifications. For example, transmitter module 400 is implemented as a component (e.g., section 202) of retimer 200 illustrated in FIG. 2. The transmitter module 400 includes a quad lane transmitter supporting data streams of up to 28.125 GBd with PAM-4 modulation (56.25 Gb/s). A common PLL provides services all four lanes.

The data path receives up to four lanes of PAM-4 data from the core and prepares them for optical transmission. In various embodiments, transmitter module 400 operates in quad-lambda mode at 28.125 GBd, transmitting data streams with PAM-4 modulation (56.25 Gb/s). Data are transmitted as optical signals. For example, the AFE block of transmitter module 400 includes an externally modulated laser for optical data transmission, and a single transmit PLL is shared among the four transmit lanes. For example, the four transmit lanes are shown in FIG. 4 as four slices. In addition to data transmission (i.e., from host Rx to line Tx), transmitter module 400 also operates in shallow line loopback mode (e.g., operating at PAM-4 to PAM-4).

Data are received at cross point 401 as shown. For standard egress operation, data are received from the host Rx and processed for transmission. For loopback operation, data are received from the line Rx section. Data are first stored at a FIFO buffer as shown. A pattern generator block follows the FIFO buffer. The pattern generator block is provided for each of the communication lanes, and it is configured to generate predetermined test patterns to help remove jitter. The pattern generator block can support a wide range of formats, such as PRBS 58/31/23/16/15/13/11/9/7, PRBS13Q, SSPRQ, and/or others. PRBS can be generated independently on PAM-4 most significant bits (MSB) and least significant bits (LSB). In a specific embodiment, 2×63 bit programmable-repeatable fixed patterns are generated. Other patterns, such as square wave, JP03A, JP03B, and transmitter linearity test patterns can be generated as well. For example, consecutive identical digit (CID) jitter tolerance patterns can be generated as well.

Transmitter module 400 includes a soft FEC encoder, which may be implemented in conjunction with the alignment marker (AM) framer. For example, the soft FEC encoder incurs a 5% overhead, and it is configured to operate in 200GE mode, where the host data is KP4 FEC encoded. In other operation modes, the soft FEC may be bypassed. The AM framer can be configured to support different protocols, such as 25GE, 50GE, 100GE, 200GE and 400GE protocols. The AM framer can be configured to provide lock protocol status and 200G framing alignment information for the soft FEC encoder. In various embodiments, squelch control is provided as a part of the DSP.

Data, after processed by AM framer and/or soft FEC, are provided to the error injection block, along with data stored at the test pattern memory block. The test pattern memory block operates in binary mode and linear mode. In binary mode, the test pattern memory block provides up to 32,768 bits for four transmitter lanes, where each transmitter can have a unique pattern with identical lengths. In linear mode, the test pattern memory block provides up to 16,384 UI (each 8-bits) on one transmitter lane. The error injection block selectively receives inputs from both the AM framer block and the test pattern memory block. For example, error injection block is configured to introduce faults to the test patterns received from the test pattern memory to improve the quality of the test.

The PAM-4 encoding/Gray coding block follows the error injection block. For example, at this block, Gray coding, polarity inversion, PAM-4 encoding, PAM-4 MSB/LSB swapping, and/or other coding processes may be performed. Next, Tx DSP block performs various DSP processes on the encoded data. At the AFE block, data are converted to optical signal for transmission. If the transmitter module 400 is operating in a testing mode, test patterns from the test pattern memory block (instead of actual data) are transmitted.

The host receivers are implemented with various features. For example, an OIF 56G-VSR compliant interfaces is implemented with adaptive CTLE/AGC that is able to equalize 10 dB channels loss plus up to 4 dB total package loss. Decision feedback equalizer (DFE) may be included for trace reflection cancellation. Independent CDRs can be configured in each lane with full-rate LC VCO. Similarly, independent power down control is provided for each lane. Host receivers may also include support for reference-less operation. Additional features include SNR monitor, adaptive equalizer convergence monitor, and loss of signal (LOS) detector with programmable thresholds, PAM-4 inverse gray coding, polarity inversion, PAM-4 decoding, and PAM-4 MSB/LSB swap. Host receivers may also have diagnostic features, such as PRBS13Q, PRBS58/31/23/16/15/13/11/9/7 checkers, PRBS auto-polarity detection, and continuous identical symbol detection.

Data transmission can be configured with quad 28.125 GBd data streams with PAM-4 modulation (56.25 Gb/s), or Quad 28.125 Gb/s transmit data streams with NRZ modulation. While host receivers are implemented as multiple slices, a single transmit PLL is shared among the four transmit lanes. For features such as diagnostics, the host receivers can be configured to operate in shallow line loopback mode.

Figure 5:
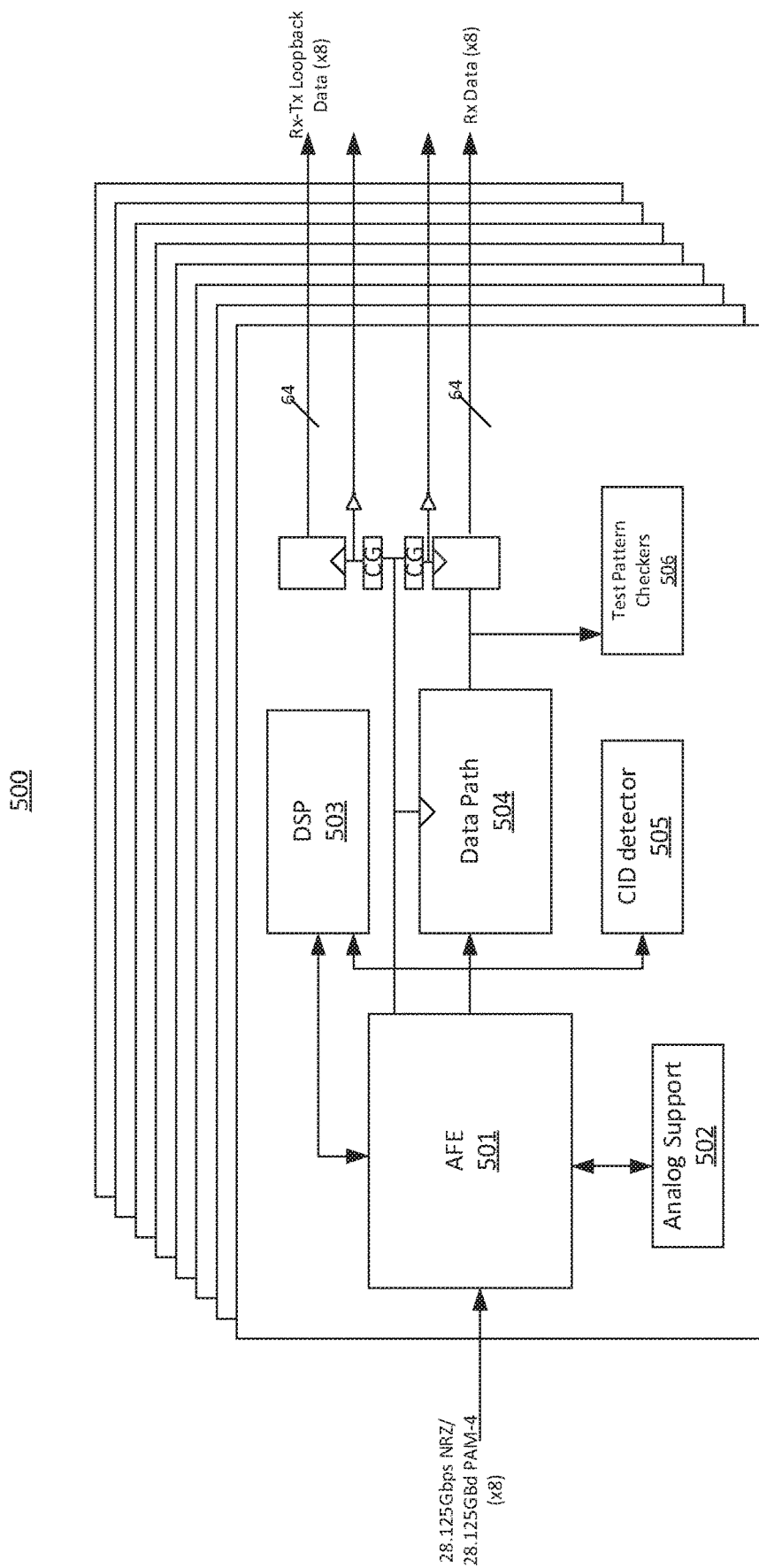
FIG. 5 is a simplified block diagram illustrating a host side receiver module 500 according to embodiments of the present invention.

FIG. 5 is a simplified block diagram illustrating a host side receiver module 500 according to embodiments of the present invention. This diagram is merely an example, which should not unduly limit the scope of the claims. One of ordinary skill in the art would recognize many variations, alternatives, and modifications. For example, host side receiver module 500 implements section 201 in FIG. 2. Receiver module 500 may operate in different modes with an aggregate bandwidth of 200 Gbps. For example, receiver module 500 supports eight lanes of NRZ data or four lanes of PAM-4 data. As shown in FIG. 5, the receiver lanes are capable of receiving data streams at 28.125 Gbps in NRZ mode or 28.125 GBd in PAM-4 mode. For example, data received from the eight data lanes are transmitted through eight parallel data transmission lanes. The AFE 501 receives optical signal through optical communication channels. The AFE 501 is configured to handle various types of data format, such as 56 Gbps of PAM-4 data. In various embodiments, AFE 501 supports adaptive CTLE/AGC for equalizing 10 dB loss channels and up to 4 dB total package loss. The AFE block 501 may also include a decision feedback equalizer covering h3 to h12 used to equalize reflections. The AFE block 501 may also include independent a clock data recovery (CDR) module with full rate inductive/capacitive (LC) voltage controlled oscillator (VCO). Each of the eight data lanes may have its own independent power down control. The AFE block 501 may additionally support reference-less operation (receiver is capable of coarse tuning and frequency locking its VCO to incoming data without an external pilot tone). The AFE block 501 may also include a signal-to-noise ratio (SNR) monitor and/or an adaptive equalizer convergence monitor. Additionally, the AFE block 501 may also include a loss of signal detector with programmable threshold (e.g., 50 mV to 100 mV). It is to be appreciated that the functionalities of AFE block 501 may be provided by the analog support block 502.

Data streams, once processed by the AFE block 501, are transmitted through data path 504. In various embodiments, data path block 504 provides PAM-4 inverse gray coding, polarity inversion, PAM-4 decoding, and/or PAM-4 MSB/LSB swapping.

DSP block 503, as shown, is coupled to AFE block 501, data path block 504, and CID detector block 505. For example, DSP block 503 is capable of processing 32 UI of data and error samples per clock cycle. In various implementations, DSP block 503 provides six shared plus ten DFE LMS engines and two shared search engines. The DSP block 503 may additionally provide calibration and adaption (e.g., by determining operating parameters) for LFEQ, CTLE, AGC gain, sample offsets, thresholds, phases, and DFE. The DSP block 503 may also include eye monitor with 256 steps over 2 unit-intervals and 512 voltage steps. To perform signal processing, the DSP block 503 may be implemented with capture buffer for 32 unit-intervals of aligned data, error, and eye monitor samples and qualifiers.

It is to be appreciated that the host side receiver module 500 provides various diagnostic features. For example, diagnostic features include PRBS13Q, and PRBS58/31/23/16/15/13/11/9/7 checkers. PRBS can be checked independently on PAM-4 MSB or LSB or over full word. Diagnostic features also include PRBS auto-polarity detection. Fixed pattern of any 64-bit pattern can be continuously repeated for error checking. Diagnostic features also include detection of continuous identical symbols. Additionally, diagnostic features may include a clock monitor.

Figure 6:
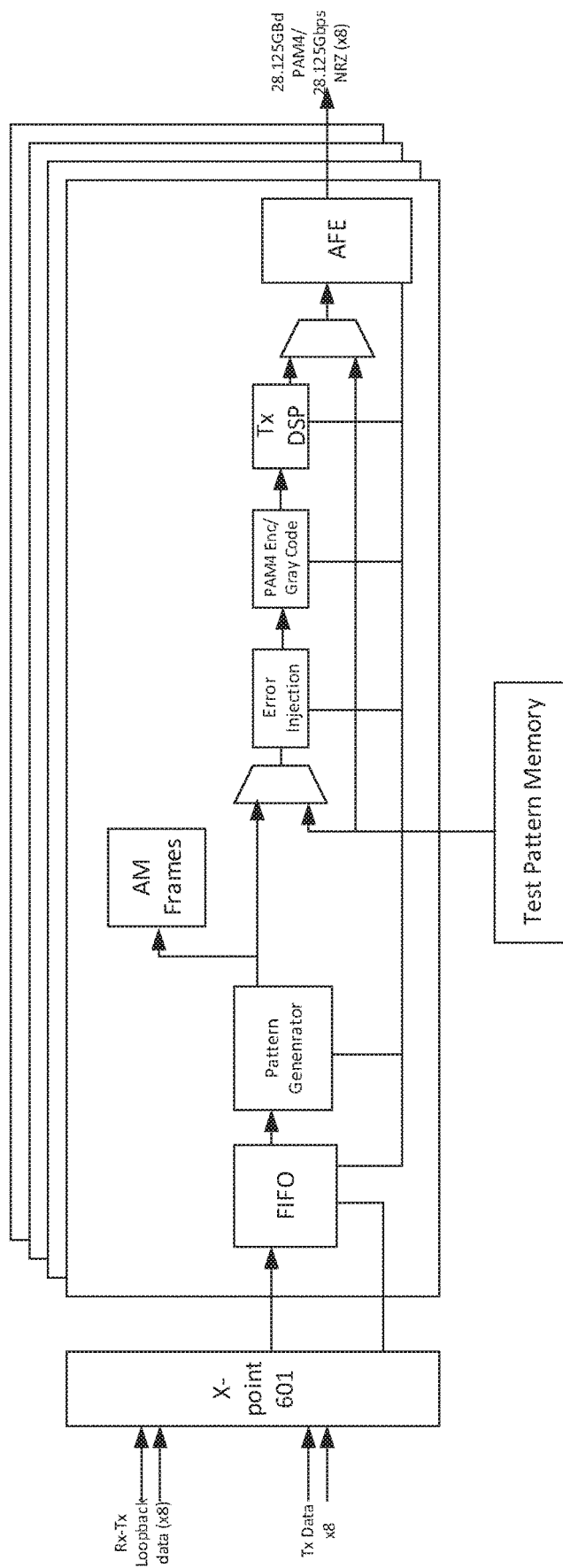
FIG. 6 is a simplified block diagram illustrating a transmitter at the host side transmitter module 600 according to embodiments of the present invention.

FIG. 6 is a simplified block diagram illustrating a transmitter at the host side transmitter module 600 according to embodiments of the present invention. This diagram is merely an example, which should not unduly limit the scope of the claims. One of ordinary skill in the art would recognize many variations, alternatives, and modifications. For example, transmitter module 600 is implemented as a component (e.g., section 203) of retimer 200 illustrated in FIG. 2. The transmitter module 600 includes a quad lane transmitter supporting data streams of up to 28.125 GBd with PAM-4 modulation (56.25 Gb/s). Four PLLs service the 8 transmit lanes allowing for 4 independent output frequencies. The data path receives up to 8 lanes of NRZ data or 4 lanes of PAM-4 data from the core and prepares them for transmission. The cross point 601 supports the receive data streams to be transmitted on any of host transmit lanes. The received data are first processed by the FIFO buffer as shown. In various embodiments, the AM framer supports 25GE, 50GE, 100GE, 200GE and 400GE protocols. The AM framer provides protocol lock status. Data are encoded for transmission using PAM-4 communication protocol. For example, PAM-4 encoding block provides processes for polarity inversion, PAM-4 encoding, and PAM-4 MSB/LSB swap. The transmitter module 600 further provides squelch control. The pattern generator block generates test patterns for each communication. The pattern generator logic supports PRSB58/31/23/16/15/13/11/9/7, PRBS13Q, SSPRQ, and/or other formats. For example, PRBS can be generated independently on PAM-4 MSBs and LSBs. In a specific embodiment, 2×63 bit programmable-repeatable fixed patterns are used. Square wave, JP03A, JP03B, transmitter linearity test patterns, and CID jitter tolerance pattern can be used as well. The test pattern memory can be configured in a binary mode, which provides up to 32,768 bits for four transmitter lanes, and each transmitter can have a unique pattern with identical lengths. The test pattern memory can operate in linear mode: up to 16,384 UI (each 8-bits) on one transmitter lane. The host side transmitter module 600 may additionally include features such as error injection and continuous identical symbol detector.

In various embodiments, link monitors (e.g., configured as a part of line receiver slices) are provided. Among other features, link monitors are utilized to detect errors for verification and correction. FIG. 7 is a high-level block diagram illustrating a single slice of the link monitor for serving a PAM-4 or NRZ data stream according to embodiments of the present invention. This diagram is merely an example, which should not unduly limit the scope of the claims. One of ordinary skill in the art would recognize many variations, alternatives, and modifications. As shown in FIG. 7, received data (64 bits) are processed by the PRBS verifier block, and the output of the PRBS verifier block is provided to the FEC monitor block. For example, a PRBS verifier block (e.g., as shown in FIG. 3) provides a full set of PRBS pattern verifiers, which can be straight or bit-interleaved. It provides bit error information to the FEC monitor and FEC correction emulator blocks. The FEC Monitor block analyzes the receive error statistics to estimate the FEC error statistics that would have been achieved if the link had been FEC encoded and to locate correctable blocks of errors. For multi-lane protocols, the FEC monitor blocks in adjacent lanes communicate to produce statistics for the whole link. In various embodiments, the block supports 25GE, 50GE, 100GE, 200GE and 400GE FEC protocols.

The FEC Correction Emulator block uses the correctable block location information from the FEC Monitor, in conjunction with the received bit error from the PRBS verifier to create a corrected output data stream. Note that error correction is not available in 400GE mode. For example, correction is performed by the BLK/ALGN/SM block. The received data without correction is processed by the delay/regeneration block for output.

For operating the communication system, a general purpose input output (GPIO) interface is implemented to provide a flexible method of collecting status from outside the device, or conveying status points from within the device to the outside world without using the register interface. In various embodiments, communication system can support a number of GPIOs in different configurations.

It is to be appreciated that embodiments of the present invention implemented in various ways. For example, re-timers according to embodiments of the present invention operate in low power and are compatible with PAM communication protocols. In various implementations, re-timer form factors are suitable for QSFP56 200G modules. Certain re-timers implement PAM-4 electrical outputs and includes an integrated EML driver. Re-timers can support both 56.25 Gb/s data streams with PAM-4 modulation and 28.125 Gb/s data streams with NRZ modulation. Lane-based diagnostic link monitor can be implemented to analyze receive error statistics and estimate BER.

While the above is a full description of the specific embodiments, various modifications, alternative constructions and equivalents may be used. Therefore, the above description and illustrations should not be taken as limiting the scope of the present invention which is defined by the appended claims.

What is claimed is:
1. A data communication device comprising:
a host receive section for receiving incoming host data from a host device, the host receive section including a plurality of host receive lanes, the plurality of host receive lanes including a first host receive lane, the first receive lane including a first analog interface and a first pattern checker module;
a host transmit section for transmitting outgoing host data to the host device, the host transmit section including a plurality of host transmit lanes and a host cross point section, the plurality of host transmit lanes including a first host transmit lane, the first host transmit lane including a first buffer and a first pattern generator;
a link monitor section coupled to the host receive section and the host transmit section;
a line receive section for receiving incoming line data from a line device, the line receive section including a plurality of line receive lanes, the plurality of line receive lanes including a first line receive lane, the first line receive lane including a first sequence checker and a first soft FEC decoder;
a line transmit section for transmitting outing line data to the line device, the line transmit section including a plurality of line transmit lanes and a line cross point section, the plurality of line transmit lanes including a first line transmit lane, the first line transmit lane including a first soft FEC encoder; and
a management interface module coupled to the link monitor section;
wherein:

the incoming host data are transmitted to the line device via the host receive section and line transmit section in an egress operation;

the incoming line data are transmitted the host device via the line receive section and the host transmit section in an ingress operation.

2. The device of claim 1 wherein the incoming host data are transmitted back to the host device via the host receive section and host transmit section in host loopback operation.

3. The device of claim 2 wherein the incoming host data pass through the host cross point section.

4. The device of claim 1 wherein the line host data are transmitted back to the line device via the line receive section and line transmit section in line loopback operation.

5. The device of claim 1 wherein the management interface module comprises a management data input/out module.

6. The device of claim 5 wherein the management interface module comprises a microprocessor unit.

7. The device of claim 1 wherein the incoming data pass through the link monitor section during the egress operation.

8. The device of claim 1 wherein the first line receive lane further comprises a digital signal processor.

9. The device of claim 8 wherein the digital signal process is configured to process eye histograms.

10. The device of claim 1 wherein the first sequence checker is configured to perform PRBS check.

11. The device of claim 1 wherein the first line transmit lane further comprises a error injection block.

12. The device of claim 1 wherein the first line transmit lane further comprises a error injection block.

13. A data communication device comprising:
a host receive section for receiving incoming host data from a host device, the host receive section including a plurality of host receive lanes;
a host transmit section for transmitting outgoing host data to the host device, the host transmit section including a plurality of host transmit lanes and a host cross point section;
a line receive section for receiving incoming line data from a line device, the line receive section including a plurality of line receive lanes;
a line transmit section for transmitting outing line data to the line device, the line transmit section including a plurality of line transmit lanes and a line cross point section;
a link monitor section coupled to the host receive section and the line transmit section, the link monitor section being configured to detector errors from the incoming host data and the incoming line data; and
a management interface module coupled to the link monitor section;
wherein:

the incoming host data are transmitted to the line device via the host receive section and line transmit section in an egress operation;

the incoming line data are transmitted the host device via the line receive section and the host transmit section in an ingress operation.

14. The device of claim 13 wherein the link monitor sections analyzes error statistics associated with the incoming host data.

15. The device of claim 13 wherein the line transmit section comprises a test pattern memory block.

16. The device of claim 13 wherein the line transmit section further comprises an analog front end section for transmitting optical signals.

17. The device of claim 13 wherein the host transmit section comprises four slices corresponding to the plurality of host transmit lanes.

18. A data communication device comprising:
a host receive section for receiving incoming host data from a host device, the host receive section including a plurality of host receive lanes, the plurality of host receive lanes including a first host receive lane, the first receive lane including a first analog interface and a first pattern checker module;
a host transmit section for transmitting outgoing host data to the host device, the host transmit section including a plurality of host transmit lanes and a host cross point section, the plurality of host transmit lanes including a first host transmit lane, the first host transmit lane including a first buffer and a first pattern generator;
a link monitor section coupled to the host receive section and the host transmit section;
a line receive section for receiving incoming line data from a line device, the line receive section including a plurality of line receive lanes, the plurality of line receive lanes including a first line receive lane, the first line receive lane including a first sequence checker and a first soft FEC decoder;
a line transmit section for transmitting outing line data to the line device, the line transmit section including a plurality of line transmit lanes and a line cross point section, the plurality of line transmit lanes including a first line transmit lane, the first line transmit lane including a first soft FEC encoder; and
a management interface module coupled to the link monitor section, the management interface module comprising an MDIO block and an MCU block.

19. The device of claim 18 further comprising a storage unit coupled to the management interface, the storage unit comprising instruction for initiating the host receive section.

20. The device of claim 18 wherein the storage unit further comprises instruction for DSP sequencing codes.

* * * * *